United States Patent [19]

Fink et al.

[11] Patent Number: 5,010,885
[45] Date of Patent: Apr. 30, 1991

[54] ULTRASONIC ECHOGRAPH WITH CONTROLLABLE PHASE COHERENCE

[75] Inventors: Mathias Fink, Meudon; Fabrice Cancre, Paris; Patrick Pesqué, Perigny, all of France

[73] Assignee: U.S. Philips Corporation, New York, N.Y.

[21] Appl. No.: 354,010

[22] Filed: May 19, 1989

[30] Foreign Application Priority Data

May 20, 1988 [FR] France .................. 88 06789

[51] Int. Cl.$^5$ .................................. A61B 8/00
[52] U.S. Cl. ......................... 128/660.07; 73/625; 73/599; 128/660.06
[58] Field of Search .............. 128/660.07, 660.06; 73/625, 599

[56] References Cited

U.S. PATENT DOCUMENTS

| 4,005,382 | 1/1977 | Beaver | 340/1 |
| 4,140,022 | 2/1979 | Maslak | 73/626 |
| 4,180,790 | 12/1979 | Thomas | 367/7 |
| 4,561,019 | 12/1985 | Lizzi et al. | 73/602 X |
| 4,662,223 | 5/1987 | Riley et al. | 73/626 |
| 4,835,689 | 5/1989 | O'Donnell | 73/626 X |
| 4,886,069 | 12/1989 | O'Donnell | 73/625 X |
| 4,938,225 | 7/1990 | Fink | 128/660.07 |

OTHER PUBLICATIONS

H. E. Melton, Jr., "Parallel-Focusing and Speckle Reduction in Medical Ultra-sonic Imaging", Ultrasonics Symposium Proceedings, Boston, MA, Nov. 5th-7th, 1980, pp. 1073-1075 (New York).

Fink, M., "Ultrasonic echography Apparatus for Medical Imaging", EP 293 996A, publ. Dec. 1988.
T. Yokota et al., "3-D Incoherent Ultrasonic Imaging", Acoustical Imaging, vol. 12, 1982, pp. 621-634 (New York).
S. Singh et al., "A Modified Sum Focussing Approach to Ultrasonic Speckle Reduction", Acoustical Imaging, vol. 15, 1987, pp. 481-486 (New York).
J. G. Abbott et al., "Multi-Scan Processing in a Phased Array Imaging System", 1978 Ultrasonics Symposium Proceedings, Cherry Hill, N.J., Sep. 25th-27th, 1978, pp. 220-224 (New York).
J. G. Abbott et al., "Acoustic Speckle: Theory and Experimental Analysis", Ultrasonic Imaging, vol. 1, 1979, pp. 303-324 (New York).

Primary Examiner—Francis Jaworski
Attorney, Agent, or Firm—William Squire

[57] ABSTRACT

On emission and/or on reception, circuits impose on the signals emitted and/or received, delays in accordance with a random or pseudo-random delay law. On emission, just as on reception, this delay law is superposed on that for focusing and angulation of the signals. On emission, the law is obtained, for example, by causing variation of the instants of triggering of the generators of signals for the excitation of the transducers. On reception, either parallel random delay lines or conditional inversion circuits are included. These circuits permit the breakdown of the coherence of the ultrasonic waves on emission, on reception, or on both simultaneously, may be used in an analogue version, as well as in a digital version.

13 Claims, 5 Drawing Sheets

ULTRASONIC ECHOGRAPH WITH CONTROLLABLE PHASE COHERENCE

BACKGROUND OF THE INVENTION

1. Field of the Invention

The present invention relates to an ultrasonic echograph comprising at least one set of n ultrasonic transducers, a stage for the emission of ultrasonic waves towards a medium to be explored, and a stage for the reception and for the processing of the ultrasonic signals returned by the obstacles encountered in the said medium. The n ultrasonic transducers may be disposed in a one-dimensional array, in a two-dimensional matrix, or in a plane or curved annular array with or without sectorial fragmentation.

This invention is applicable, in a particularly advantageous manner, in the medical field and in that of the non-destructive monitoring of materials.

2. Description of the Prior Art

In the medical field, the application may be qualitative, when it is principally desired to obtain the formation of images which are as precise as possible of the media explored and particularly to demonstrate the contours of organs and the specular walls such as veins, as well as quantitative, when it is principally desired to characterize in a precise manner the biological tissues explored with a view to their pathological investigation, for example by the prescise measurement of quantities such as the parameter of attenuation of the ultrasonic waves in the media explored. Such medical applications are described, for example, in the article "Electronique medicale : principe de l'imagerie à ultrasons et analyse quantitative en imagerie à ultrasons" (Medical Electronics: Principle of Ultrasonic Imagery and Quantitative Analysis in Ultrasonic Imagery) which appeared in the journal "Toute l'Electronique", No. 497, Oct. 1984, pp. 31-37.

In the field of the non-destructive monitoring of materials, it is likewise important either to undertake qualitative detections of fissures or of any defects within the materials or to effect any quantitative measurement relevant to the non-destructive monitoring, in this case again especially by the accurate measurement of parameters associated with the local behaviour of the ultrasonic waves (for example by the measurement of the ultrasonic attenuation). The materials concerned are then actually solid materials, such as materials incorporating grains or fibres, composite materials, ceramics, etc . . . , all multimaterials in general, as well as loose materials, such as cheeses, diary products, meats, and, in a general way, all those encountered in particular, in the field of food agriculture.

The article "Detection of spatially nonuniform ultrasonic radiation with phase sensitive piezoelectric and phase insensitive acoustoelectric receivers" by L. J. Busse and J. G. Miller, which appeared in the journal "Journal of Acoustical Society of America", 70(5), Nov. 1981, pp. 1377-1386, emphasizes the importance of the concept of phase in the matter of propagation and of detection of ultrasonic waves, and demonstrates that the use of transducers which are insensitive to the instantaneous phase of the waves may lead to more reliable observations, both in qualitative imaging and in the case of quantitative measurements. Such a finding is made, for example, in the course of measurements of attenuation as a function of the frequency, by investigating, for receiving transducers of specified aperture, the variations of the amplitude of the ultrasonic waves as a function of the frequency: this amplitude decreases greatly and/or is eliminated around certain frequencies. There is in fact, at certain frequencies and in certain situations, a partial or total compensation of the components of the complex signal investigated, while the local variations of the ultrasonic energy detected remain very limited with transducers which are insensitive to the phase.

The ultrasonic echographs which are in current use are not, however, equipped with transducer structures which are insensitive to the phase and therefore liable to mask the effects of the coherence of the ultrasonic waves emitted. The qualitative determination of contours of organs or of the presence of defects within materials (or, more generally, of the presence of fixed specular walls within the medium explored) is therefore disturbed by the interferences, which may be constructive or destructive, indicated hereinabove, which are due to the multidiffusers contained within the medium investigated, and which lead to images which are tainted by the defect referred to as "speckle", that is to say to the spotted or grainy appearance. Moreover, the measurement of acoustic parameters (such as the attenuation), which results from the analysis of echographic signals originating from the multidiffusers distributed in a random manner within the medium investigated, requires the recording of a large number of decorrelated echographic lines and thus the displacement of the transducer during the measurement; this significantly reduces the spatial resolution. Moreover, this analysis of the echographic signals is disturbed by the presence of possible specular reflectors within the medium, and this cannot be remedied except by a precise localization of such reflectors with a view to the elimination or to the reduction of the effects of their presence.

SUMMARY OF THE INVENTION

The object of the invention is therefore to propose an ultrasonic echograph by virtue of which it is possible to obtain an improved echographic image of the medium examined, as well as to undertake accurate determinations of acoustic parameters without loss of spatial resolution.

To this end, the subject of the invention is an ultrasonic echograph, characterized in that the emission stage comprises, upstream of the ultrasonic transducers allocated to the emission of the ultrasonic waves, a corresponding number of generators of signals for the excitation of the transducers allocated to the emission, the generators of excitation signals being connected to a single clock circuit provided to define the instants of triggering of each one of the generators in accordance with a random delay law superposed on a focusing law and possibly angulation law imposed on the transducers allocated to the emission, and the values of the random delays being distributed in such a manner that the variations of these values are included within an interval of time corresponding at least to the transit time of a half-wavelength by the ultrasonic waves within the medium examined.

In a first variant which simplifies the construction of the emission stage, the subject of the invention is likewise an ultrasonic echograph, characterized in that the emission stage comprises, upstream of the ultrasonic transducers allocated to the emission of the ultrasonic waves, a circuit for the control of the excitation of the transducers allocated to the emission, the circuit itself comprising, on the one hand, a generator of excitation signals and, on the other hand, at the output of this generator and in as many parallel channels as there are transducers allocated to the emission, delay lines provided to delay the instants of excitation of the transducers by the excitation signal in accordance with a random delay law superposed on a focusing law and possibly angulation law imposed on the transducers allocated to the emission, the values of the random delays being distributed in such a manner that the variations of these values are included within an interval of time corresponding at least to the transit time of a half-wavelength by the ultrasonic waves within the medium examined.

In a second variant which further simplifies the construction of the emission stage, the subject of the invention is likewise an ultrasonic echograph, characterized in that the emission stage comprises, upstream of the ultrasonic transducers allocated to the emission of the ultrasonic waves, a circuit for the control of the excitation of the transducers allocated to the emission, and in that the circuit itself comprises, on the one hand, a generator of excitation signals and, on the other hand, at the output of this generator and in as many parallel channels as there are transducers allocated to the emission, delay lines provided to delay the instants of excitation of the transducers by the excitation signal in accordance with a focusing law and possibly angulation law imposed on the said transducers allocated to the emission and conditional inversion circuits provided to establish by wiring, a law for the pseudo-random inversion of phase in two states 0 or $\pi$ to be superposed on the focusing and angulation law.

The implementation of the invention may be undertaken not in the emission stage, but in the reception and processing stage. To this end, the subject of the invention is then an ultrasonic echograph, characterized in that the reception and processing stage comprises, between delay lines for the focusing and possibly for the angulation of the beam which are provided at the output of the ultrasonic transducers allocated to the reception and the circuits for the processing of the echographic signals, N subassemblies which are themselves composed of n delay lines, each random, which are connected, wire to wire, to the n focusing delay lines in such a manner as to superpose a random delay law on the focusing and possibly angulation law imposed on the transducers allocated to the reception, and of N summators of the n output signals of these random delay lines, and in that the values of the delays of these n random delay lines of the N subassemblies are distributed in a random manner in such a manner that the variations of these values are included within an interval of time corresponding at least to the transit time of a half-wavelength by the ultrasonic waves within the medium examined.

In a first variant for simplifying the reception stage, similar to that proposed for the emission stage, the subject of the invention is likewise an ultrasonic echograph, characterized in that the reception and processing stage comprises, between delay lines for the focusing and possibly for the angulation of the beam which are provided at the output of the ultrasonic transducers allocated to the reception and the circuits for the processing of the echographic signals, N subassemblies which are themselves composed of n conditional inversion circuits each which are connected, wire to wire, to the n focusing delay lines in such a manner as to superpose a law for the pseudo-random inversion of phase in two states 0 or $\pi$ on the focusing and possibly angulation law imposed on the transducers allocated to the reception, and of N summators of the n output signals of these conditional inversion circuits.

In a second variant of construction of the reception stage, likewise comparable with that proposed for the emission stage, the subject of the invention is again an ultrasonic echograph, characterized in that the reception and processing stage comprises, between delay lines for the focusing and possibly for the angulation of the beam which are provided at the output of the ultrasonic transducers allocated to the reception and the circuits for the processing of the echographic signals, a set of parallel conditional inversion circuits in a number equal to that of the delay lines and themselves each composed of a non-inverting channel and of an inverting channel in parallel, and N summators of the n output signals of these conditional inversion circuits, and in that the connections between the outputs of the non-inverting and inverting channels of the conditional inversion circuits and the inputs of the corresponding summators are formed by wiring as a function of a law for the pseudo-random inversion of phase in two states 0 or $\pi$ to be superposed on the focusing and possibly angulation law imposed on the transducers allocated to the reception.

In the case of essentially qualitative applications, in the reception stage, the circuits for the processing of the echographic signals comprise N detectors of the envelope of the output signals of the summators, a summator of envelopes for the summation of the N envelopes thus constituted, and a visual display and/or storage subassembly.

In the case where it is desired to determine in a quantitative manner quantities such as the parameter of attenuation in the media explored, the circuits for the processing of the echographic signals comprise N circuits for the definition of a sliding time window, N fast Fourier transformation circuits, an adder of the respective outputs of the said Fourier transformation circuits, and a processing unit for the determination of the parameters associated with the mean output spectral power of the adder and for the evaluation of the parameter of attenuation $\beta$ of the ultrasonic waves within the medium explored.

In the case where this determination of the attenuation parameter is carried out at a particular frequency F, the circuits for processing the echographic signals comprise N band-pass filters, N envelope detectors, N logarithmic amplifiers and a circuit for measurement of slope and for the evaluation of the parameter of attenuation $\beta$ of the ultrasonic waves within the medium explored.

The constructions of the reception and processing stage are analogue, but may also be digital. The echograph according to the invention is then characterized in that n analogue-digital converters are respectively provided between the output of the n transducers and the input of the n focusing and angulation delay lines, and in that the circuits which follow the converters are digital.

Finally, in their analogue as well as digital versions, the construction of the reception and processing stage may be combined with one of the three constructions proposed for the emission stage.

In the echograph structures thus proposed, the essential technical effect is the breakdown of the phase coherence of the signals emitted and/or of the echographic signals processed corresponding to the coherent or non-coherent ultrasonic waves received by the transducers. In fact, the delays introduced on emission and/or on reception are random, that is to say that their values represent N constructions of a same stochastic process determined by its definition interval (this interval is of the order of the acoustic period) and by its spatial correlation length. Furthermore, these delays are selected in such a manner that the signals at the output of the emission stage and/or at the output of the various subassemblies are decorrelated. For example, in the case of a breakdown of coherence undertake on reception, the envelopes of the N signals are then different when the echos originate from a multidiffusing medium or, on the other hand, substantially identical when the echos originate from a specular reflector. Thus, the signal-to-noise ratio is increased and the grainy appearance of the image, or "speckle", is substantially reduced, while the information relating to the specular reflectors is intensified.

In a preceding French Patent Application No. 87/07,795, which was not published at the filing date of the present application, it had already been proposed, rather than making measurements with the aid of transducers made insensitive to the phase (such as those described in the article by L. J. Busse and J. G. Miller referred to hereinabove), that is to say made insensitive to the local coherence of phase of the components of a complex signal, to break down this coherence of the ultrasonic waves propagating within the medium to be examined, by relying upon movable mechanical means to undertake this operation. More specifically, the technical solution presented in the application consists in associating with at least one transducer of the transducer structure of the echograph at least one random phase screen situated on the path of the ultrasonic propagation beam. This screen is constructed in the form of a wafer of a material, at least one face of which exhibits a roughness of random granulometry, the dimensions of the grains having to be sufficient to permit the obtaining of phase differences proceeding as far as phase inversion, and is displaceable in relation to the ultrasonic beam either by rotation or by translation, or by rotation and translation combined.

Thus, in the case of this preceding application, by recording a same echographic line for various positions of the random phase screen, and then by summing all the corresponding envelopes, the maxima of the envelopes which are associated with the specular reflectors, which are still situated in the same positions, are linearly additive, while those associated with the multidiffusers, the distribution of which within the medium examined is, unlike the specular reflectors, entirely random, are additive only in accordance with a square root growth, the improvement of the contrast of the specular reflectors being thus of the order of the square root of the number of distinct positions of the screen.

However, the mechanical displacement of the random phase screen slows down the duration of the measurements all the more, the greater is the number of positions which is adopted. Although arrangements may be made for the purpose of reducing this duration (for example, the setting up of two random phase screens which are movable relative to one another, permitting the reduction of the difference of positions between two successive measurement positions), this characteristic which is inherent in the principle employed limits, in practice, the rhythm of the measurements to approximately one image per second. On the other hand, the measurements in real time remain entirely possible with the echograph structure proposed in the present application.

BRIEF DESCRIPTION OF THE DRAWINGS

The particular features and advantages of the invention will now become evident, in a more precise manner, in the description which follows and in the accompanying drawings, which are given by way of non-limiting examples and in which.

DESCRIPTION OF THE PREFERRED EMBODIMENT

An apparatus for the exploration of media by ultrasonic echography, or an ultrasonic echograph, comprises, in general, at least one ultrasonic transducer associated, on the one hand, with a stage for the emission of the ultrasonic waves towards the medium to be explored and, on the other hand, with a stage for the reception and for the processing of the ultrasonic echos returned by the various obstacles encountered by the said ultrasonic waves within the medium explored. Such an echograph structure is conventional and will not be described in detail here. It will simply be stated that the transducer structure per se may, in the present case, be a one-dimensional or two-dimensional array of such ultrasonic transducers, or an annular array which is plane or curved (that is to say substantially in the form of a spherical cup, with a view to a prefocusing of the waves emitted or of the signals received) with or without sectorial fragmentation.

Figure 1:
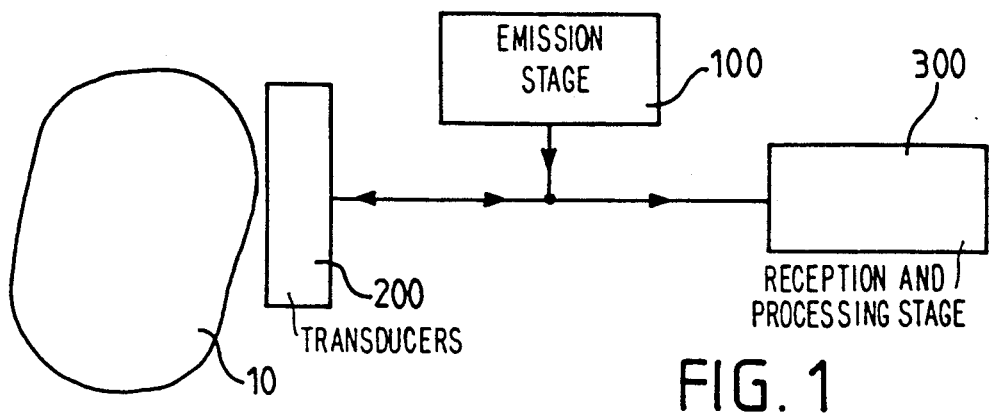
FIG. 1 shows the overall diagram of an ultrasonic echograph according to the invention.

In the embodiments which will be described, the invention is implemented either in the emission state, or in the reception and processing stage, or possibly in one and the other. In the example effectively described and represented in FIG. 1, an emission stage 100 controlling the emission of the ultrasonic waves towards a medium 10 to be explored is connected, to this end, to a set 200 of n ultrasonic transducers, n being in this case equal, for example, to 64 and the corresponding transducers being subsequently designated by the references 101 to 164. This same set of transducers which is used for the emission is in this case also used at reception (but it would be possible to use distinct transducer structures for the emission and the reception), and is therefore likewise connected to a reception and processing stage 300. The stage 100 and the stage 300 will be described in detail further on. Beforehand, it will be recalled that the medium 10 to be explored is a biological organ or tissue, or alternatively a material, and that, within this medium, there may essentially be present both reflectors referred to as specular, of dimensions exceeding the wavelength of the ultrasonic waves and thus behaving as a mirror in relation to these waves, and also multi-diffusers, obstacles which are significantly smaller than the said wavelength and thus causing a diffuse dispersion of the ultrasonic waves, almost uniformly in all directions.

Figure 2:
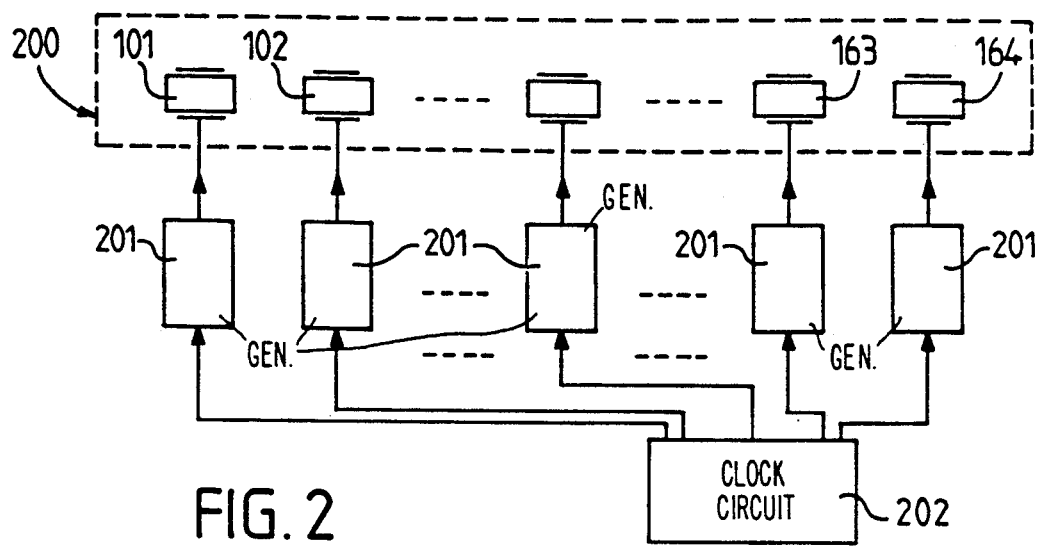
FIGS. 2 and 3 show two embodiments of the emission stage of the echograph of FIG. 1.

In the embodiment represented in FIG. 2, the emission stage, in which the implementation of the invention is located, comprises to this end, upstream of those of the transducers which are allocated to the emission (this may be possibly the sum total of the n transducers 101 to 164), a corresponding number of generators 201 of signals for the excitation of the said transducers allocated to the emission. These generators 201 are, moreover, connected to a clock circuit 202 which determines the instants of triggering of each one of them, in accordance with a random delay law which permits the modification, at will, of the phase coherence of the ultrasonic signals which will be emitted.

The random nature of the delays must be interpreted in the sense which has been defined hereinabove (different constructions of a same stochastic process). This random delay law is, of course, superposed on the focusing and possibly angulation law which is, in general, imposed on the transducers allocated to the emission. The implementation of this delay law is effected by providing, in the clock circuit 202, a generator of pulsed signals and by carrying out the counting of these signals. The triggering of the generators of excitation signals 201 then takes places for certain specified positions of the pulsed signals thus counted, these positions being fixed in accordance with the random delay law sought and the focusing and angulation law imposed.

Figure 3:
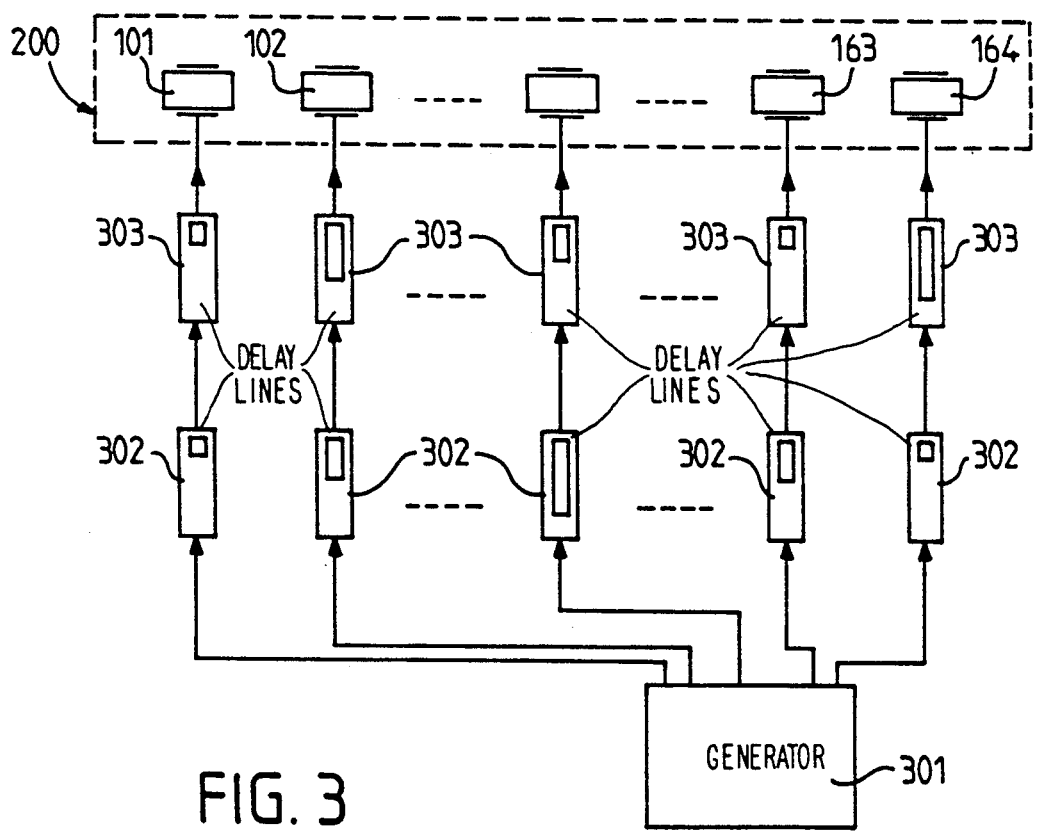

A first modified embodiment of this emission stage, represented in FIG. 3, consists in no longer providing, in the circuit for the control of the excitation of the transducers allocated to the emission, any more than a single generator 301 of excitation signals. There are then provided at the output of this generator 301 as many parallel channels as there are transducers allocated to the emission. These parallel channels comprise, on the one hand, delay lines 302, provided to delay the signals for the excitation of the transducers in accordance with the focusing and angulation law imposed on them, and, on the other hand, delay lines 303 which are provided to superpose the supplementary delays, the random ones, which they add to those of the lines 302. These delays of the delay lines 303 are fixed in accordance with a random delay law which is thus superposed on the said focusing and angulation law. The delay lines 302 and 303 are in series, or possibly structured in a single set of delay lines imposing within each parallel channel the respective delay corresponding to the superposition of the two laws.

In the case of the construction of FIG. 3, a demonstration has been given, on an explanatory basis, of the respective role of the delay lines 302 and 303 by diagrammatically representing, within the represenation of these lines, a segment proportional to the magnitude of the delay contributed by the corresponding line. Thus, a distinction has been drawn between the coordinated nature of the focusing (and angulation, if the beam is oblique) delays contributed by the lines 302 and the random nature of the supplementary delays introduced by the lines 303. In one or the other of the constructions of FIGS. 2 and 3, the values of these supplementary random delays are distributed in such a manner that the variations of these values are included within an interval of time corresponding at least to the transit time of a half-wavelength by the ultrasonic waves within the medium examined, but this choice is made only by way of example and does not constitute a limitation of the invention.

In these two embodiments, the stage for reception and for processing of the echograph is of the conventional type. Conversely, it may be the emission stage which is of the conventional type, and the reception and processing stage which permits the implementation of the invention. As previously, it is possible to use for the reception all or some of the transducers provided. In this case, it will be assumed that the n ultrasonic transducers are used, and it will be considered that this number is, for example, chosen to be equal to 64, without this choice being limiting.

Figure 4:
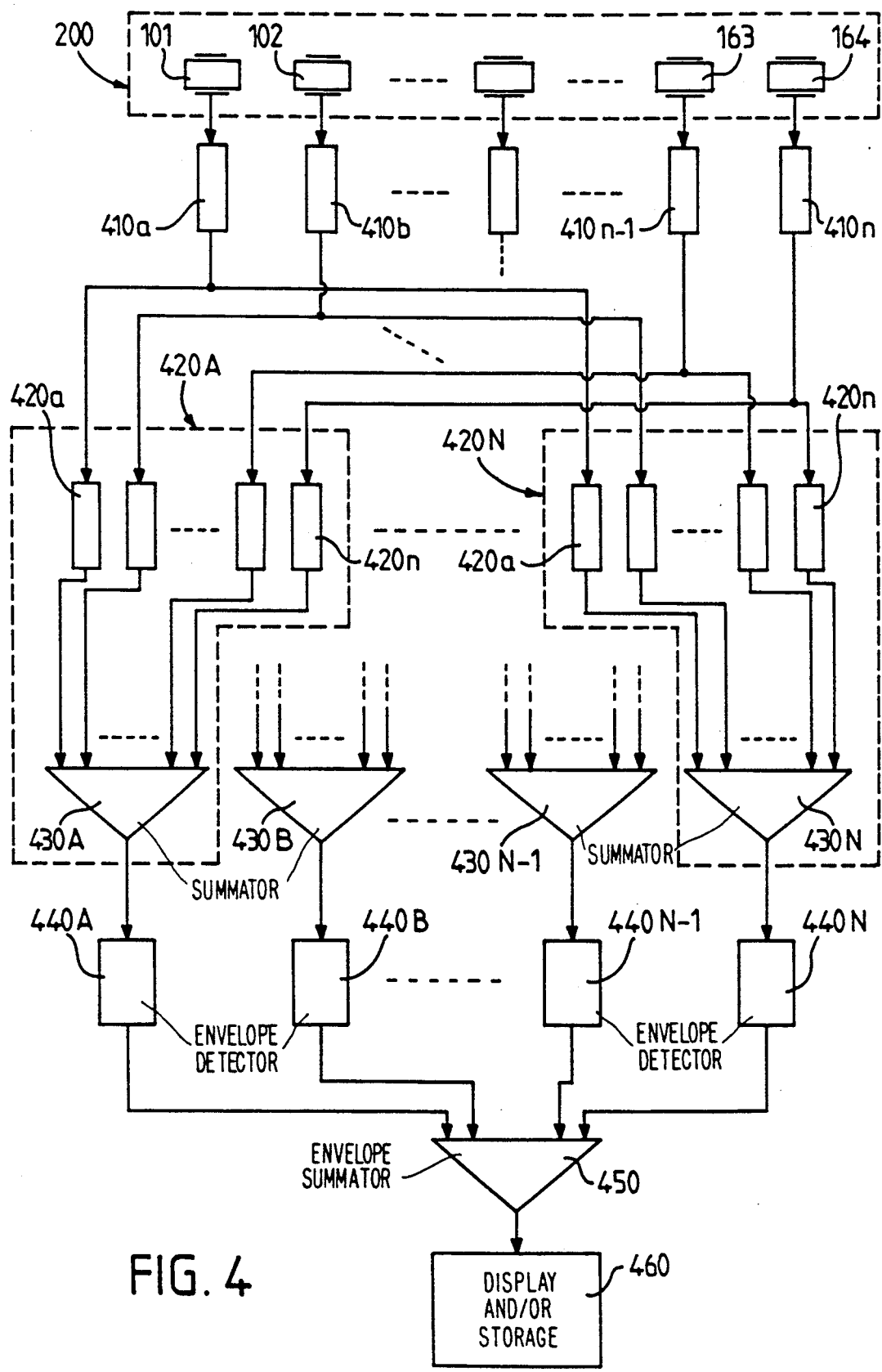
FIG. 4 shows an embodiment of the reception and processing stage of the echograph.

In a first embodiment, represented in FIG. 4, the reception and processing stage comprises, on the one hand, 64 (n in the general case) delay lines 410a to 410n, of the same type as the lines 302 (FIG. 3) and ensuring in the conventional manner the electronic focusing on reception, as well as possibly the orientation of the detection beam in the case of an echograph with phase shift employing a transducer structure referred to as a phased array. It is, in fact, known that an echograph with a phase shift provides the possibility of causing a variation, electronically, of the delay associated with each individual transducer of a phased array, not only on emission for obliquely directing the ultrasonic waves in relation to the plane of the array, but also on reception for dynamically focusing the echos received obliquely.

These conventional delay lines are followed by N identical subassemblies 420A to 420N (in this case N=50, for example) each comprising 64 (n in the general case) delay lines 420a to 420n; only the delay lines of the subassemblies 420A and 420N, for example, have been represented in FIG. 4, but they are, of course, equal in number to N×n. In each subassembly, the values of the delays of the 64 (or n) delay lines are distributed in a random manner, the variations of these values being included within an interval of time corresponding at least to the transit time of a half-wavelength by the ultrasonic waves within the medium examined. Each subassembly 420A to 420N operates in parallel, and arrangements are made to select the various random delays of each one of them in such a manner that the envelopes of the signals present at the output of each subassembly are not correlated among themselves.

These 50 (or N) subassemblies in parallel also comprise 50 (or N) summators 430A to 430N, each carrying out the summation of the 64 (or n) corresponding echographic signals (or radio-frequency signals). At the output of these summators of the subassemblies there are then provided 50 (or N) envelope detectors 440A to 440N, a summator 450 which adds the 50 (or N) envelopes originating from the envelope detectors, and a visual display and/or storage subassembly 460.

Figure 5A:
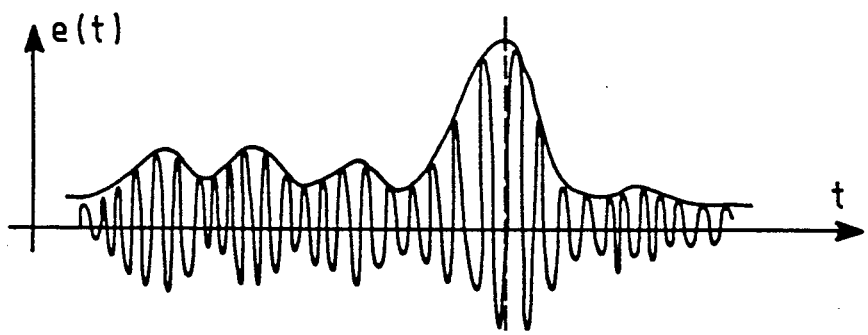
FIGS. 5a, 5b, 5c permit an understanding of how the information concerning the position of the specular reflectors may be extracted from the echographic lines, in the implementation of the echograph according to the invention, when the echograph comprises a reception and processing stage such as that of FIG. 4.
Figure 5B:
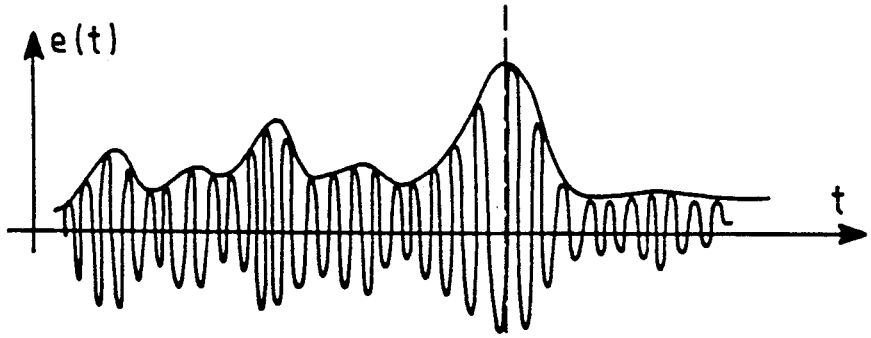
Figure 5C:
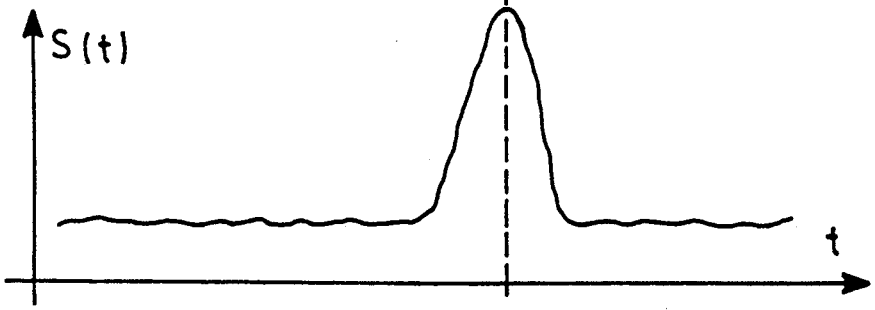

At the output of the 50 (or N) summators 430A to 430N, there are thus available 50 (or N) decorrelated echographic signals. FIGS. 5a and 5b, which show examples of output signals of two of the summators 430A to 430N, show respectively the recording of one echographic line e(t) for two distinct choices of the values of the random delays. It is found, at the output of the corresponding envelope detectors, that the maxima of the corresponding envelope (represented for convenience on the same figures) which are associated with specular reflectors appear in the same positions; this is not the case for those which are associated with the multidiffusers. FIG. 5c shows the output signal S(t) of the summator 450 and demonstrates the fact that this summator, in forming the mean of the 50 (or N) output signals of the envelope detectors 440A to 440N, considerably attenuates or even obliterates the presence of the maxima and thus smooths the grain of the image, while maintaining the information relating to the specular reflectors.

In the embodiment of the reception and processing stage which has just been described, a substantially improved echographic image of the medium examined has thus been obtained. By a different processing of the echographic signals, it is also possible to make precise quantitative measurements of parameters such as the attenuation parameter, generally called $\beta$, of the ultrasonic waves within the medium explored.

Figure 6A:
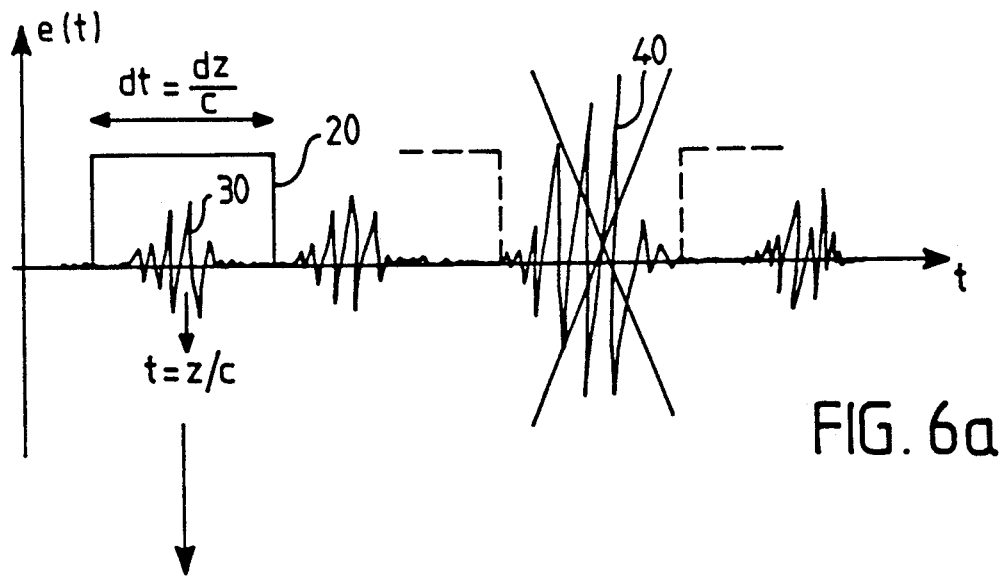
FIG. 6a shows how an echographic line may be analyzed with the aid of a sliding time window.

As illustrated by FIG. 6a, echographic lines e(t) recorded for a given distribution of the values of the random delays are cumulatively analysed through an analysis time window 20 which is displaced along the echographic lines e(t). This analysis window 20 defines a time zone of width dt corresponding to a thickness of tissues $dz = c \cdot dt$. The determination of the attenuation parameter is based on the analysis of the echos 30 emitted by the multidiffusers distributed within the medium 10 explored. In this sense, the specular reflection zones 40 then correspond to parasitic signals, against which the processing previously described in conjuction with FIGS. 5a, 5b and 5c permits action, by eliminating the troublesome effect of these zones: to do this, it is sufficient, as indicated by FIG. 6a, to displace the analysis window 20 along the echographic lines while avoiding the specular reflection zones, which are known because they are entirely localized within the echographic lines.

Figure 6B:
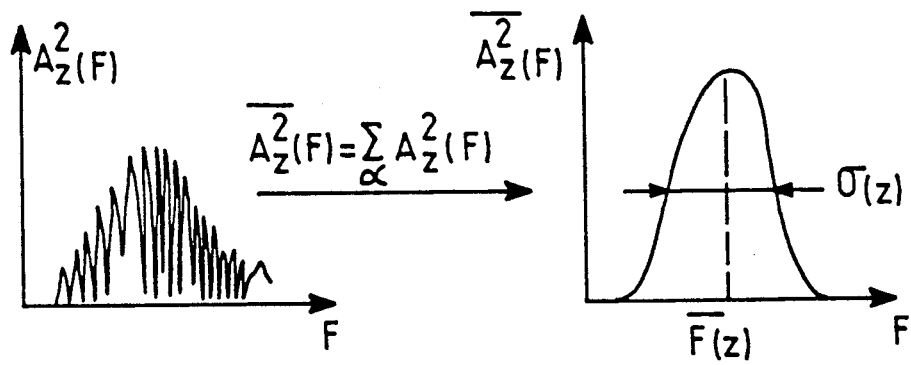
FIG. 6b represents, for an echographic line, the spectral power as a function of the frequency F and demonstrates that it is not possible to deduce from the spectrum its principal parametric factors (spectral width, central frequency), this spectrum having, in fact, an appearance affected by noise and containing numerous troughs.
Figure 6C:
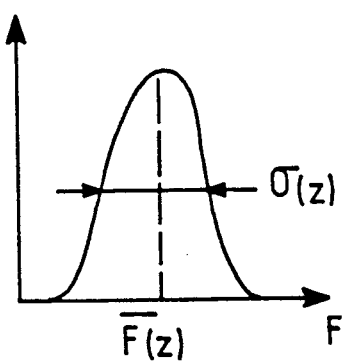
FIG. 6c represents the mean spectral power smoothed over the echographic set of lines, again as a function of the frequency.
Figure 6D:
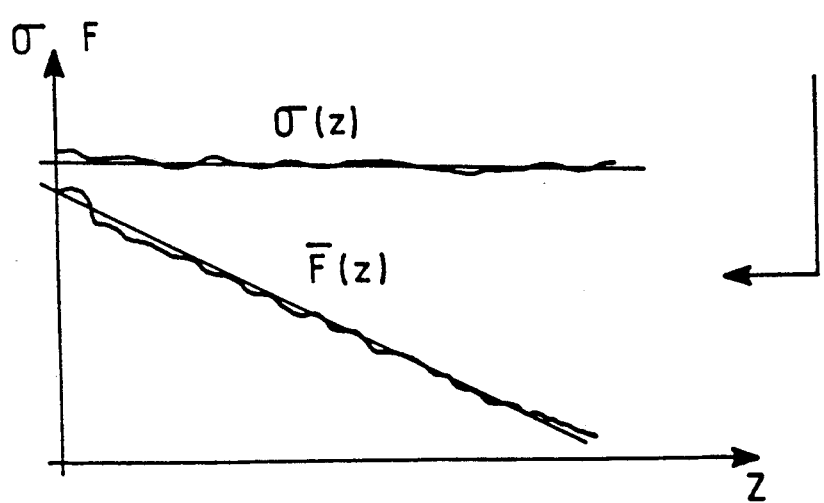
FIG. 6d shows the development of the central frequency $F(z)$ and of the spectral width $\sigma(z)$ of the mean spectral power as a function of the depth z.

For a given position of the analysis window 20 along the echographic line e(t), a position characterized by the time t, that is to say also by the depth $z = ct/2$, and for a given distribution of the values of the random delays, the corresponding spectral power designated $A^2_z(F)$ and represented as a function of the frequency F is, in the case of FIG. 6b, calculated by Fourier transformation. The appearance of the spectrum is, in general, very greatly affected by noise and is difficult to use with a view to a precise determination of the attenuation parameter, since this spectrum exhibits troughs due to the presence of numerous echos from the multidiffusers situated within the exploration window. On the other hand, and this is an important advantage of the invention, when the summation takes place, within the same analysis window 20, of the elementary spectral powers $A^2_z(F)$ available at the output of the summators 430A to 430N, the result obtained is a smoothed mean spectral power $\overline{A^2_z(F)}$ (FIG. 6c) of far better quality, no longer containing any thoughs, and which permits, in particular, the determination with a high precision, for each depth z, of the central frequency $\overline{F}(z)$ and the spectral width $\sigma(z)$ of the mean spectral power $\overline{A^2_z(F)}$. Knowing the variations of $\overline{F}(z)$ and of $\sigma(z)$ with z (FIG. 6d), the attenuation parameter $\beta$ sought is deduced therefrom with the aid of the equation:

$$\frac{d\overline{F}(z)}{dz} = -2\beta\sigma^2(z)$$

Figure 7A:
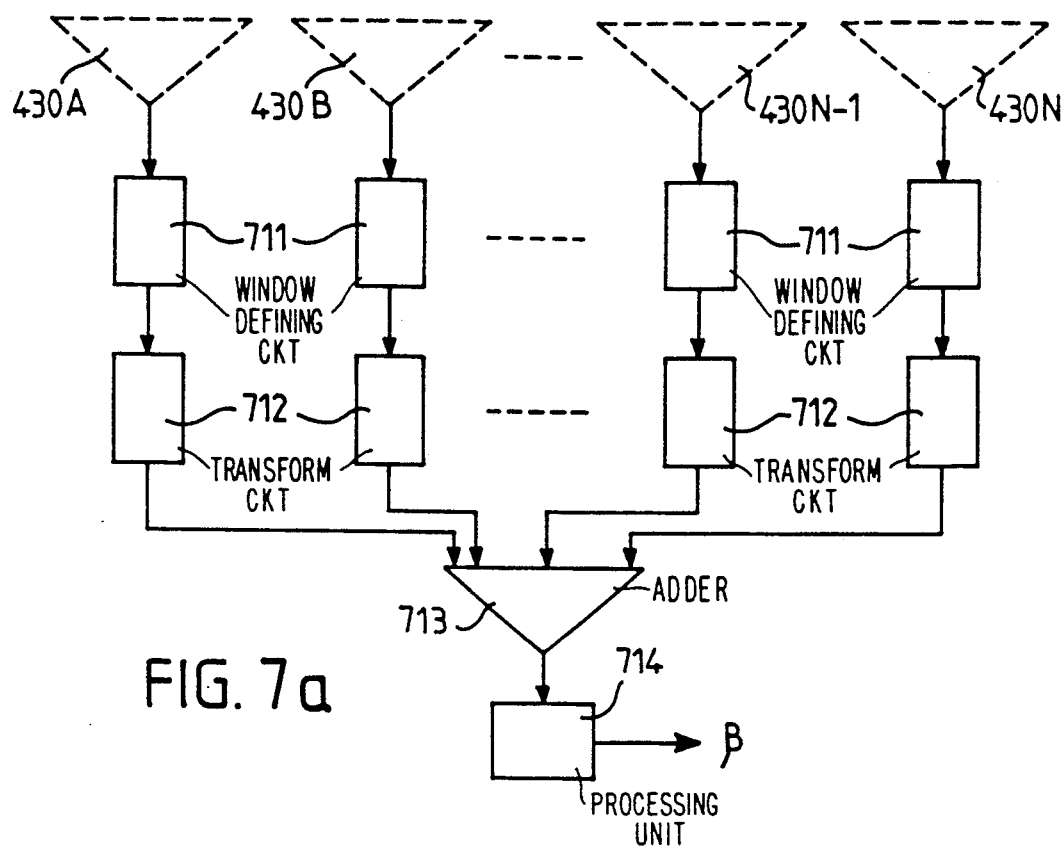
FIGS. 7a and 7b correspond respectively to two modified embodiments of the reception and processing stage of FIG. 4, and, more specifically, represent the modifications of the stage downstream of the summators of the output signals of the delay line subassemblies, when this stage is intended for the determination of the parameter $\beta$ of attenuation of the ultrasonic waves within the medium explored.

Another method permitting the calculation of $\overline{F}(z)$ and $\sigma(z)$ without using the technique, which is always troublesome to implement, of Fourier transformation, consists in determining the central frequency $\overline{F}(z)$ from the mean, for a given distribution of the random delays, of the number of passages through zero of the echographic lines within the analysis window 20 centered on t (or $z = ct/2$). It is, in fact, know that this number of passages through zero is proportional to the central frequency $\overline{F}(z)$. With regard to the spectral width $\sigma(z)$, it is possible to benefit from the fact that it virtually does not vary with the dept z in calculating it, once and for all, from the recording of echos on a plane which reflects the ultrasonic signal emitted. FIG. 7 shows, according to two variants, the modifications of the reception and processing stage of FIG. 4, downstream of the summators 430A to 430N, when this stage is intended for determination of the attenuation parameter $\beta$. According to the variant of FIG. 7a, which is related to FIGS. 6a to 6d, the echographic lines e(t) are analysed, for each subassembly 420A to 420N, within a circuit 711 for the definition of a sliding time window. The elementary spectral powers $A^2_z(F)$ are then calculated by a fast Fourier transformation circuit 712, and then summed by means of an adder 713. A processing unit 714 then calculates the parameters $\sigma(z)$ and $\overline{F}(z)$ of the mean spectral power $\overline{A^2_z(F)}$ obtained at the output of the adder 713; this finally permits the deduction of $\beta$ from the variations of $\sigma(t)$ and $\overline{F}(z)$ as a function of z.

Figure 7B:
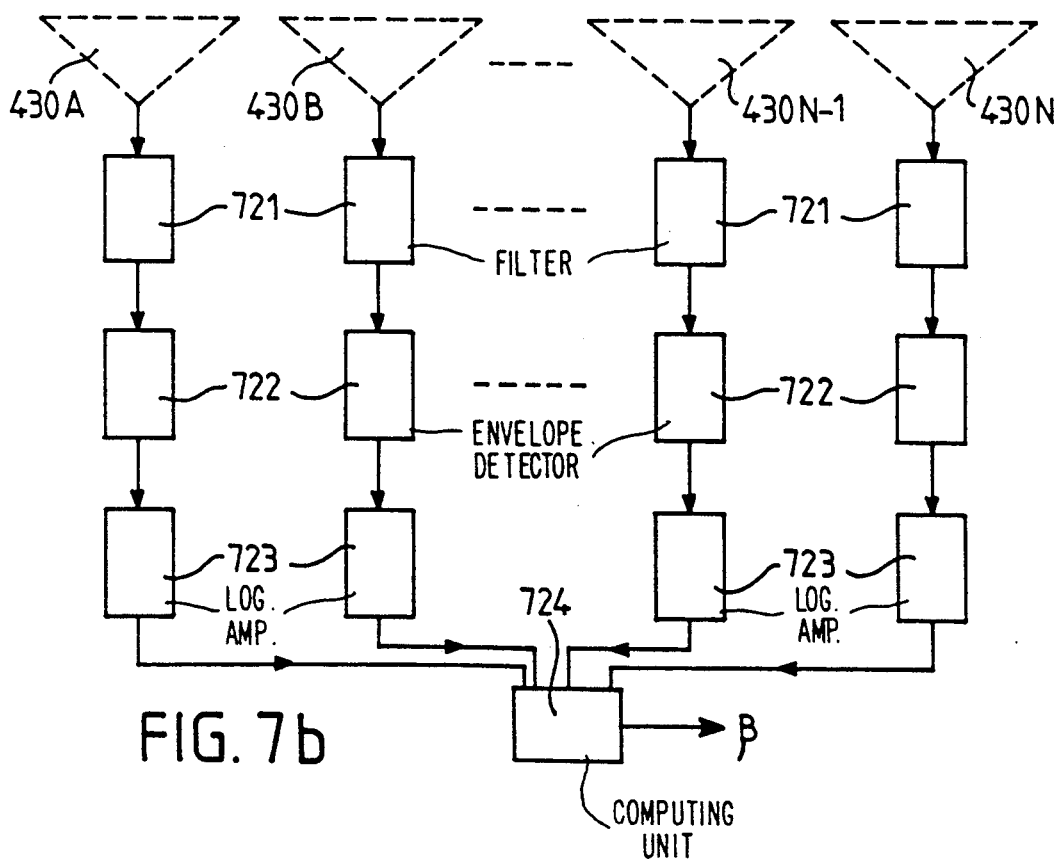

According to the variant of FIG. 7b, the aim is to measure the attenuation at a particular frequency F. To do this, the output echographic signal of each subassembly is filtered at the frequency F by a narrow bandpass filter 721 centred on F. The mean envelope of this filtered signal is calculated by an envelope detector 722. The mean envelope obtained in this manner is a decreasing exponential curve $\exp(-\alpha(F)ct/2)$, where $\alpha(F)$ is the attenuation for a frequency F. A logarithmic amplifier 723 transforms this exponential curve into a straight line of slope $-\alpha(F)c/2$. Measuring this slope with the aid of a computing unit 724, which carries out a linear regression and provides the slope $-\alpha(F)c/2$ which is desired, gives the attenuation $\alpha(F)$. By changing the central frequency F of the band-pass filter 721, it is possible to study the variations of $\alpha(F)$ as a function of F and to deduce $\beta$ therefrom by $\beta = \alpha(F)/F$.

The present invention is, of course, not limited to the embodiment described and represented hereinabove, based on which variants may be proposed without nevertheless departing from the scope of the invention. In particular, it is now clear that the improvement of the contrast of the specular reflectors is of the order of the square route of the number N of subassemblies (linear addition of the maxima associated with the specular reflectors, addition of the maxima associated with the multidiffusers in accordance with a square-root growth). It is, however, possible to diminish the number of subassemblies, for example by a factor or 2, and to use a plurality of shots along the same echographic line, by changing the value of the delays in the subassemblies between the shots. The image rate is, of course, reduced by the same factor, but the electronic circuits are simpler and therefore less costly.

A signigicant cost reduction may likewise be obtained by replacing the delay lines 420a to 420n of each subassembly—or of one or a plurality of them, at least—by circuits referred to as conditional inversion circuits. These circuits, which comprise only electronic inverters, and are therefore inexpensive, multiply the output signals of the delay lines 410a to 410n either by +1 or by −1 (the choice is either imposed on the construction of the echograph or modifiable by mechanical or electronic means). Such a version of an echograph permits the obtaining of a family of pseudo-random codes consisting of +1 or −1, the correlation functions of which are identical to those obtained in the case of random delay laws.

The simplified variant which has just been described thus uses, if all the random delay lines are replaced by conditional inversion circuits, a number n ×N of these inversion circuits. A new simplification may be obtained by reducing the number of these circuits, by no longer providing, for example, any more than n conditional inversion circuits placed at the output of the n delay lines 410a to 410n and each comprising two parallel channels, one non-inverting and the other functioning as an inverter, the connnections between the outputs of the non-inverting and inverting channels and the n inputs of the corresponding summators 430A to 430N being then established by wiring as a function of the pseudo-random delay law which it is desired to obtain and to superpose on the focusing and angulation law.

Moreover, particular values of n and of N were chosen in the previously described example, but it is clear that this choice is not limiting and that other lower or higher values may be adopted, the value of n being, preferably, a power of 2 such as 32, 64, 128, etc... (the currently known constructions do not, however, exceed n=128).

On the other hand, FIG. 4 shows a similar embodiment of the reception and processing stage, but the implementation of the invention may likewise be proposed in a digital version, by providing at the output of the n transducers 200, in front of the n focusing and angulation delay lines 410, n analogue-digital converters, the circuits provided to follow the converters then being similar to those of FIG. 4 but now digital. In the embodiment of FIG. 4 proposed in a digital version, it is likewise necessary to provide at the output of the envelope summator 450 a digital-analogue converter which restores analogue signals to the visual display and/or storage subassembly 460.

It will likewise be mentioned that the simplification which consists in replacing the random delay lines by conditional inversion circuits may be set up in the emission stage likewise. In this case, it is the random delay lines 303 (see FIG. 3) which are replaced by such circuits, which are provided to establish, by wiring, on emission, a law for the pseudo-random inversion of phase in two state 0 or $\pi$, this law being superposed on the focusing and angulation law which is obeyed by the delays of the delay lines 302.

It will indeed by noted, all cases, that one or the other of the different embodiments of the emission stage may also be implemented simultaneously with one or the other of the different embodiments of the reception processing stage, in such a manner as to obtain the effect of breakdown of coherence of the phase both on emission and on reception, and no longer only on the signals emitted or on the echographic signals corresponding to the waves received by the transducers.

We claim:

1. Ultrasonic echograph comprising at least one set of n ultrasonic transducers, means for the emission of ultrasonic wave towards a medium to be explored containing obstacles to said waves, and means for the reception and for the processing of the ultrasonic signals returned by the obstacles encountered in said medium, said emission means comprising, upstream of the ultrasonic transducers allocated to the emission of the ultrasonic waves, a corresponding number of generators of signals for the excitation of the transducers allocated to the emission, said generators of excitation signals being connected to a single clock circuit provided to define the instants of triggering of each one of said generators in accordance with a random delay law superimposed on at least a focusing law imposed on the transducers allocated to the emission, the values of said random delays being distributed in such a manner that the variations of these values are included within an interval of time corresponding at least to the transit time of a half-wavelength by the ultrasonic waves within the medium examined.

2. Ultrasonic echograph comprising at least one set of ultrasonic transducers, means for the emission of ultrasonic waves towards a medium to be explored containing obstacles to said waves, and means for the reception and for the processing of the ultrasonic signals returned by the obstacles encountered within the said medium, said emission means comprising, upstream of the ultrasonic transducers allocated to the emission of the ultrasonic waves, a circuit for the control of the excitiation of said transducers allocated to the emission, said circuit itself comprising a generator of excitation signals and at the output of this generator and in as many parallel channels as there are transducers allocated to the emission, delay lines provided to delay the instant of excitation of said transducers by said excitation signal in accordance with a random delay law superposed on at least a focusing law imposed on said transducers allocated to the emission, the values of said random delays being distributed in such a manner that the variations of these values are included within an interval of time corresponding at least to the transit time of a half-wavelength by the ultrasonic waves within the mediun examined.

3. Ultransonic echograph comprising at least on set of ultrasonic transducers, means for the emission of ultrasonic waves towards a medium to be explored containing obstacles to said waves, and means for the reception and for the processing of the ultrasonic signals returned by the obstacle encountered within the medium, said emission comprising, upstream of the ultrasonic transducers allocated to the emission of the ultrasonic waves, a circuit for the control of the excitation of the transducers allocated to the emission, and in that the circuit itself comprises a generator of excitation signals and at the output of this generator and in as many parallel channnels a there are transducers allocated to the emission, delay lines provided to delay the instants of excitation of the transducers by the excitation signal in accordance with a focusing and angulation law imposed on the transducers allocated to the emission and conditional inversion circuits provided to establish, by wiring, a law for the pseudo-random inversion of phase in two states 0 or $\pi$ to be superposed on the focusing and angulation law.

4. Ultrasonic echograph comprising at least one set of n ultrasonic transducers, means for the emission of ultrasonic waves towards a medium to be explored containing obstacles to said waves, and means for the reception and for the processing of the ultrasonic waves returned by the obstacles encountered within the medium, said reception and processing means comprising, between delay lines for the focusing and for the angulation of the beam which are provided at the output of the ultrasonic transducers allocated to the reception and the circuits for the processing of the echographic signals, N subassemblies which are themselves composed of n delay lines, each random, which are connected, wire to wire, to n focusing delay lines, in such a manner as to superpose a random delay law on the focusing and angulation law imposed on the transducer allocated to the reception, and N summators of the n ouput signals of the random delay lines, the values of the delays of the n random delay lines of the N sub-assemblies are distributed in a random manner, in such a manner that the variations of these values are included within an interval of time corresponding at least to the transit time of a half-wavelength of the ultrasonic waves in the medium examined.

5. Ultrasonic echograph comprising at least one set of n ultrasonic transducers, means for the emission of ultrasonic waves towards a medium to be explored containing obstacles to said waves, and means for the reception and for the processing of the ultrasonic signals returned by the obstacles encountered within the said medium, said reception and processing means comprising, between delay lines for the focusing and for the angulation of the beam which are provided at the output of the ultrasonic transducers allocated to the reception and circuits for the processing of echographic signals, N subassemblies which are themselves composed of n conditional inversion circuits each, which are connected, wire to wire, to n focusing delay lines, in such a manner as to superpose a law for pseudo-random inversion of phase into states 0 or $\pi$ on the focusing and angulation law imposed on said transducers allocated to the reception, and N summators of the n output signals of the conditional inversion circuits.

6. Ultrasonic echograph comprising at least one set of n ultrasonic transducers, means for the emission of ultrasonic waves towards a medium to be explored containing obstacles to said waves, and means for the reception and for the processing of the ultrasonic signals returned by the obstacle encountered within the said medium, said reception and processing means comprising , between delay lines for the focusing and for the angulation of the beam which are provided at the output of the ultrasonic transducers allocated to the reception and to circuits for the processing of the echographic signals, a set of parallel conditional inversion circuits in a number equal to that of the delay lines and themselves each composed of a non-inverting channel and of an inverting channel in parallel, and N summators of the n output signals of the conditional inversion circuits, the connections between the outputs of the said non-inverting and inverting channels of the conditional inversion circuits and the inputs of the corresponding summators are formed as a function of a law for pseudo-random inversion of phase in two states 0 or $\pi$ to be superposed on the focusing and angulation law imposed on the transducers allocated to the reception.

7. Echograph according to one of claims 4 to 6, wherein the circuits for the processing of the echographic signals comprise N detectors of the envelope of the output signals of the said summators, a summator of envelopes for the summation of then N envelopes thus constitued, and a visual display and/or storage subassembly.

8. Ultrasonic echograph comprising at least one set of n ultrasonic transducers, means for the emission of ultrasonic waves towards a medium to be explored containing obstacles to said waves, and means for the reception and for the processing of the ultrasonic signals returned by the obstacles encountered within the said medium, one of said means including n summators, at the output of said N summators circuits for the processing of the N output signals of the N summators comprising N circuits for the definition of a sliding time window, N fast Fourier transformation circuits, an adder of the respective outputs of the Fourier transformation circuits, and a processing unit for the determination of the parameters associated with the mean output spectral power of the adder and for the evaluation of the parameter of attenuation $\beta$ of the ultrasonic waves within the medium explored.

9. Ultrasonic echograph comprising at least one set of n ultrasonic transducers, means for the emission of ultrasonic waves toward a medium to be explored containing obstacles to said waves, and means for the reception and for the processing of the ultrasonic signals returned by the obstacle encounters within the said medium, one of said means including N summators, at the output of said N summators circuits for the processing of the N output signals of the the summators comprise N band-pass filters, N envelope detectors, N logarithmic amplifiers and a circuit for the measurement of slope and for the evaluation of the parameter of attenuation $\beta$ of the ultrasonic waves within the medium explored.

10. Echograph according to one of claim 8 and 9, including n analogue-digital converters respectively provided between the output of the n transducers and the input n focusing and angulation delay lines, and digital circuits are provided which follow the converters.

11. Echograph according to one of claims 4-6 or 8-9 wherein said emission means comprises, upstream of the ultrasonic transducers allocated to the emission of the ultrasonic waves, a corresponding number of generators of signals for the excitation of the said transducers allocated to the emission, the generators of excitation signals being connected to a single clock circuit provided to define the instants of triggering of each one of said generators in accordance with a random delay law superposed on a focusing and angulation law imposed on transducers allocated to the emission, and the values of the said random delays being distributed in such a manner that the variations of these values are included within an interval of time corresponding at least to the transit time of a half-wave-length by the ultrasonic waves within the medium examined.

12. Echograph according to one of claims 4–6 or 8–9, wherein said emission means comprises, upstream of the ultrasonic transducers allocated to the emission of the ultrasonic waves, a circuit for the control of the excitation of said transducers allocated to the emission means, the circuit itself comprising a generator of excitation signals and at the output of this generator and in as many parallel channels as there are transducers allocated to the emission means, delay lines provided to delay the instants of excitation of the transducers by the excitation signal in accordance with a random delay law superposed on a focusing and angulation law imposed on the transducers allocated to the emission, the values of said random delays being distributed in such a manner that the variation of these values are included within an interval of time corresponding at least to the transit time of half-wavelength by the ultrasonic waves within the medium examined.

13. Echograph according to one of claims 4–6 or 8–9 characterized in that the emission means comprises, upstream of the ultrasonic transducers allocated to the emission of the ultrasonic waves, a circuit for the control of the excitation of the transducers allocated to the emission, and in that the circuit itself comprises a generator of excitation signals and at the output this generator and in as many parallel channels as there are transducers allocated to the emission, delay lines provided to delay the instants of excitation of the transducers by the excitation signal in accordance with a focusing and angulation law imposed on the transducers allocated to the emission and conditional inversion circuits provided to implement, by wiring, a law for the pseudo-random inversion of phase in two states 0 or $\pi$ to be superposed on the focusing and angulation law.

* * * * *